United States Patent Office 3,538,034
Patented Nov. 3, 1970

3,538,034
BAKING ENAMELS BASED ON AQUEOUS
BINDER FORMULATIONS
Friedrich Gress and Werner Neumann, Ludwigshafen (Rhine), and Erwin Schmidt, Frankenthal, Pfalz, Germany, assignors to Badische Anilin- & Soda-Fabrik Aktiengesellschaft, Ludwigshafen (Rhine), Germany
No Drawing. Filed Aug. 14, 1967, Ser. No. 660,187
Claims priority, application Germany, Aug. 18, 1966, 1,669,076
Int. Cl. C08g 51/24, 51/34
U.S. Cl. 260—29.3
8 Claims

ABSTRACT OF THE DISCLOSURE

Baking enamels compatible with water which contain mixtures of conventional water-compatible aminoplast and/or phenoplast and alkyd resin precondensates with special acetals boiling at from 100° to 300° C., particularly from 200 to 300° C., as flow improvers.

---

The present invention relates to baking enamels based on aqueous binder formulations containing:

(1) 4.5 to 70, particularly 9 to 50, parts by weight of a water-compatible aminoplast precondensate and/or phenoplast precondensate;
(2) 95 to 30, particularly 90 to 50, parts by weight of a water-compatible alkyd precondensate and
(3) 0.5 to 5, particularly 1 to 4, parts by weight of a flow improver;

the parts by weight in (1), (2) and (3) adding up to 100.

Baking enamels of this type are known for example from U.S. Pat. Nos. 2,681,894 and 2,981,710. They usually contain as flow improvers, nonionic wetting agents or water-compatible organic solvents, such as butanol, ethylene glycol alkyl ethers, white spirit or solvent naphtha.

The conventional flow improvers are usually associated with disadvantages: for example they have to be used in very large amounts, or they are very expensive and therefore uneconomic or they unfavorably affect the quality (imperviousness, adherence, gloss) of the enamel.

It is an object of this invention to provide baking enamels of the abovementioned type which contain flow improvers which display their special effect when used in smaller amounts than conventional flow improvers.

It is another object of the invention to provide baking enamels of the said type which contain flow improvers which when used in an amount which is comparable to or less than those used in the prior art give better surface gloss, better leveling of the surface and better bond strength of the enamel layers produced.

Still another object of the invention is to provide baking enamels of the type specified which contain flow improvers that are easier to produce than those of the prior art and make cheaper enamels because of the smaller amount required.

We have found that the said objects are achieved with baking enamels containing special acetals as flow improvers.

A baking enamel based on an aqueous binder formulation in accordance with this invention contains:

(1) 4.5 to 70, particularly 9 to 50, parts by weight of a water-compatible aminoplast precondensate and/or phenoplast precondensate;
(2) 95 to 30, particularly 90 to 50, parts by weight of a water-compatible alkyd precondensate; and
(3) 0.5 to 5, particularly 1 to 4, parts by weight of a flow improver;

the parts by weight in (1), (2) and (3) adding up to 100.

The baking enamels according to this invention contain as the flow improver an acetal having a boiling point (under standard conditions) of 100° to 300°, particularly 200° to 300° C., and the formula:

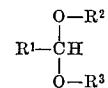

in which $R^1$ denotes a hydrogen atom or a hydrocarbon radical, particularly an alkane radical, and $R^2$ and $R^3$ denote identical or different hydrocarbon radicals, particularly alkane radicals, with the proviso that the acetals have a total of seven to twenty-six, particularly nine to twenty, carbon atoms.

A preferred type of baking enamels according to the invention contains acetals in the formula of which $R^1$ denotes a hydrogen atom or a $C_1$–$C_{12}$ alkane radical and $R^2$ and $R^3$ denotes $C_1$–$C_{12}$ alkane radicals which are identical with each other.

A particularly preferred type of baking enamels according to the invention contains di-2-ethylhexylformaldehyde acetal, di-2-ethylhexylisobutyraldehyde acetal and/or diisobutyl-2-ethylhexanal acetal as the acetal.

The following details are given concerning the components which make up baking enamels according to this invention.

The aqueous binder formulations containing:

(1) aminoplast precondensates and/or phenoplast precondensates which are compatible with water; and
(2) alkyd precondensates which are compatible with water may be those conventionally used. They are well known so that further details need not be given here. It may simply be stated that typical binder formulations of the type in question are described for example in Belgian patent specifications Nos. 663,870, 663,875, 643,520 and 664,655.

The flow improvers used are acetals of the abovementioned type, for example di-2-ethylhexylisobutyraldehyde acetal, di-2-ethylhexyl-n-butyraldehyde acetal, diethyl-2-ethylhexanal acetal, di-n-butyl-2-ethylhexanal acetal, diisobutyl-2-ethylhexanal acetal, diisobutyl-2-ethyl-4-methylpentanal acetal and di-2-ethylhexylacetaldehyde acetal.

The baking enamels according to this invention, in addition to the components already mentioned, may contain conventional other components in the conventional amounts.

The baking enamels according to the invention are used in conventional ways, the baking conditions advantageously being: 120° to 190° C., particularly 140° to 185° C., for ten to one hundred minutes, particularly fifteen to sixty minutes. The baking enamels are particularly well suited for coating sheet iron.

The invention is illustrated by the following examples in which the parts and percentages specified are by weight.

EXAMPLE 1

(1) 25 parts of a commercial 70% solution in a mixture of propanol and water of a water-compatible aminoplast precondensate;
(2) 73 parts of a commercial 55% solution in a mixture of glycol ether and water of a water-compatible alkyd precondensate;
(3) 2 parts of di-2-ethylhexylisobutyraldehyde acetal; and
(4) 50 parts of water are mixed together.

The resultant baking enamel is applied to deep drawing sheet which has been freed from rust and degreased and the coated sheet is exposed to air and baked for thirty minutes at 160° C.

Comparative experiment

The procedure of Example 1 is followed except that an equal amount of $C_8$–$C_{15}$ alcohol (conventional flow improver) is used instead of di-2-ethylhexylisobutyraldehyde acetal. The coating obtained is less uniform and covered all over with craters; it is moreover less adherent and therefore less suitable as a priming or coating enamel.

EXAMPLE 2

(1) 25 parts of a commercial 70% solution in a mixture of propanol and water of a water-compatible aminoplast precondensate;
(2) 73 parts of a commercial 55% solution in a mixture of glycol ether and water of a water-compatible alkyd precondensate;
(3) 1.5 parts of diisobutyl-2-ethylhexanal acetal; and
(4) 50 parts of water are mixed together.

The resultant baking enamel is applied to deep drawing sheet from which the rust has been removed and which has been degreased. After the coated sheet has been exposed to the air it is baked for thirty minutes at 160° C.

The coating obtained has excellent bond strength, uniform layer thickness, and outstanding gloss and is completely impervious and free from craters.

EXAMPLE 3

(1) 25 parts of a commercial 70% solution in a mixture of propanol and water of a water-compatible aminoplast precondensate;
(2) 73 parts of a commercial 55% solution in a mixture of glycol ether and water of a water-compatible alkyd precondensate;
(3) 1.5 parts of di-2-ethylhexylformaldehyde acetal; and
(4) 50 parts of water are mixed together.

The resultant baking enamel is applied to deep drawing sheet from which the rust has been removed and which has been degreased. After the coated sheet has been exposed to the air it is baked for thirty minutes at 160° C.

The coating thus obtained has excellent bond strength, uniform layer thickness and outstanding gloss and is completely impervious and free from craters.

We claim:

1. A baking enamel having an aqueous binder formulation containing:
   (1) 4.5 to 70 parts by weight of at least one of an aminoplast precondensate polymer and phenoplast precondensate phenol polymer, each of which is compatible with water;
   (2) 95 to 30 parts by weight of an alkyd precondensate resin which is compatible with water;
   (3) 0.5 to 5 parts by weight of a flow improver; and
   (4) water in an amount to provide a flowable baking enamel product, the parts by weight in (1), (2) and (3) adding up to 100, wherein the flow improver is an acetal having a boiling point (under standard conditions) of from 100° to 300° C. and the formula:

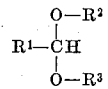

in which $R^1$ denotes a hydrogen atom or a hydrocarbon radical and $R^2$ and $R^3$ denote identical or different hydrocarbon radicals, with the proviso that the acetal contains a total of seven to twenty-six carbon atoms.

2. A baking enamel as claimed in claim 1 wherein the acetal is one in whose formula $R^1$ denotes a hydrogen atom or a $C_1$ to $C_{12}$ alkane radical, $R^2$ denotes a $C_1$ to $C_{12}$ alkane radical and $R^3$ denotes an alkane radical identical with $R^2$.

3. A baking enamel as claimed in claim 1 which contains di-2-ethylhexylformaldehyde acetal.

4. A baking enamel as claimed in claim 1 which contains di-2-ethylhexylisobutyraldehyde acetal.

5. A baking enamel as claimed in claim 1 which contains diisobutyl-2-ethylhexanal acetal.

6. A baking enamel as claimed in claim 1 which contains 9 to 50 parts by weight of component (1), 90 to 50 parts by weight of component (2) and 1 to 4 parts by weight of component (3).

7. A baking enamel as claimed in claim 1 wherein the acetal has a boiling point (under standard conditions) of 200° to 300° C.

8. A baking enamel as claimed in claim 1 wherein the acetal has a total number of nine to twenty carbon atoms.

References Cited

UNITED STATES PATENTS

| | | | |
|---|---|---|---|
| 2,782,177 | 2/1957 | Fischer et al. | 260—33.2 |
| 2,786,081 | 3/1957 | Kress | 260—33.2 |
| 2,802,804 | 8/1957 | Reid et al. | 260—33.2 |
| 2,860,171 | 11/1958 | Whitaker | 260—33.2 |
| 3,242,119 | 3/1966 | Ott et al. | 260—29.4 |
| 3,357,938 | 12/1967 | Wiener | 260—29.3 |
| 3,437,616 | 4/1969 | Nentwig et al. | 260—29.3 |

JOHN C. BLEUTGE, Primary Examiner

U.S. Cl. X.R.

117—132, 161; 260—20, 21, 22, 33.2, 842, 850